Jan. 20, 1970

L. R. SPERBERG 3,490,274

METHOD AND APPARATUS FOR CONTROL AND SIMULATION OF
FORWARD, TRANSVERSE, AND VERTICAL
FORCE CONDITIONS FOR VEHICLES

Filed Jan. 5, 1968

INVENTOR.
LAWRENCE R. SPERBERG
BY
MARCUS L. BATES

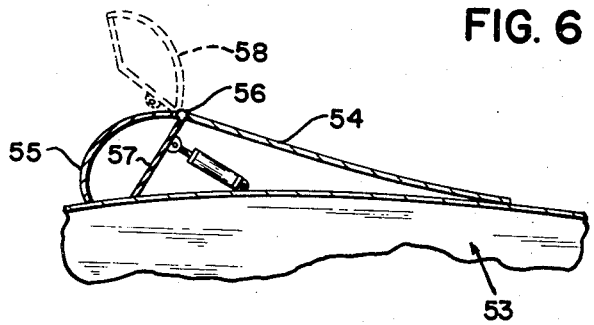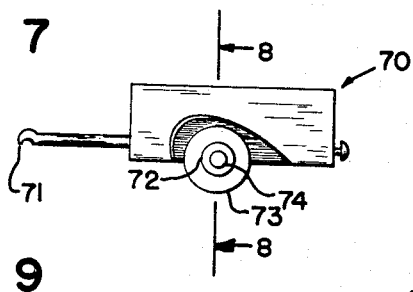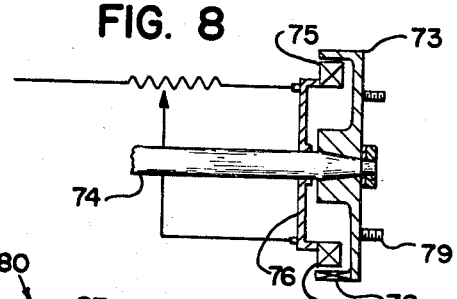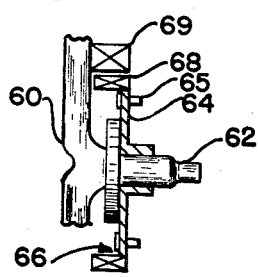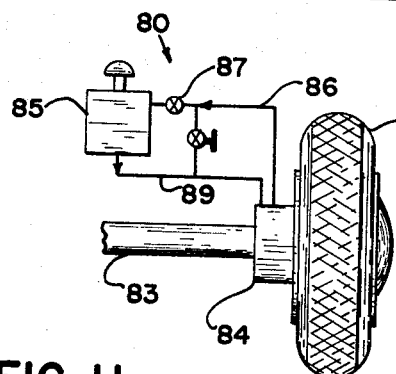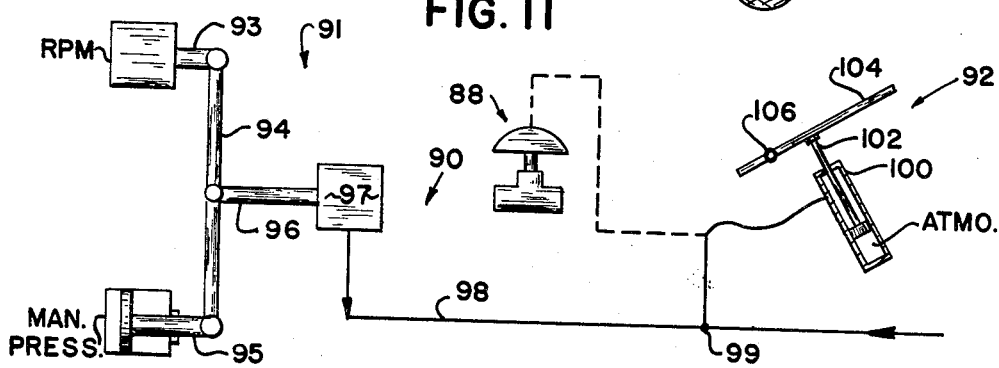

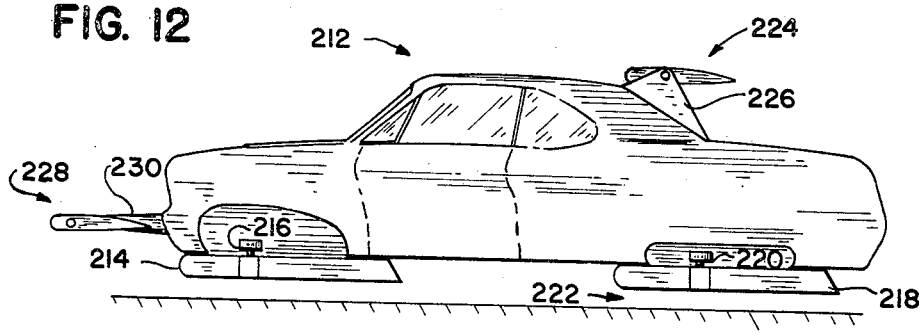
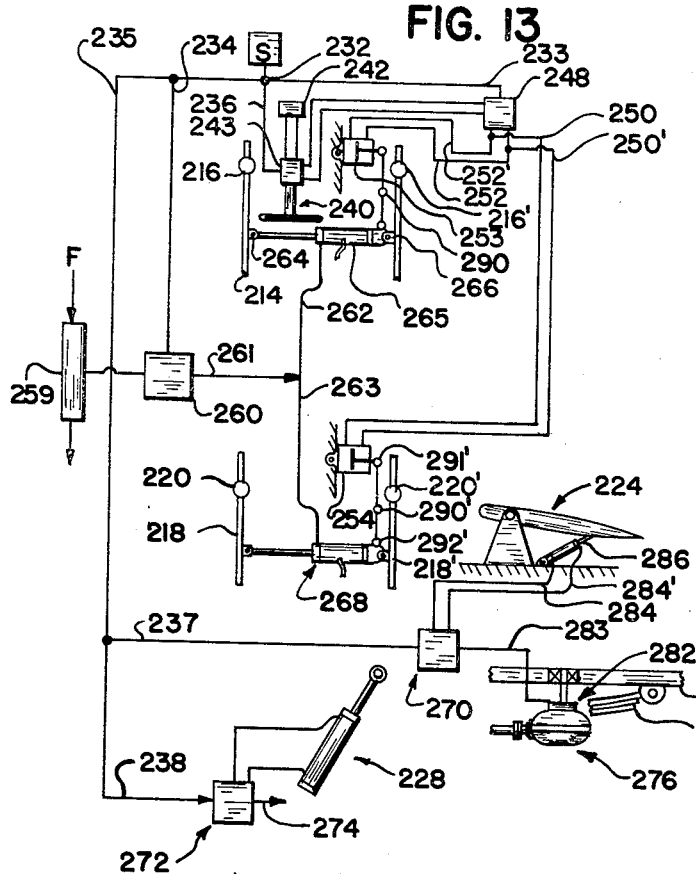
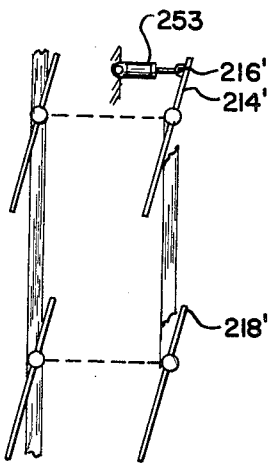
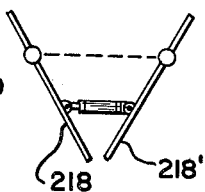
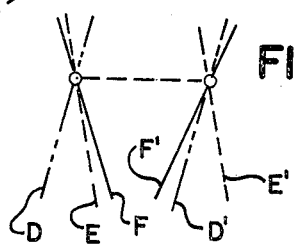
INVENTOR.
LAWRENCE R. SPERBERG
BY
MARCUS L. BATES Jan. 20, 1970

L. R. SPERBERG 3,490,274

METHOD AND APPARATUS FOR CONTROL AND SIMULATION OF
FORWARD, TRANSVERSE, AND VERTICAL
FORCE CONDITIONS FOR VEHICLES

Filed Jan. 5, 1968

INVENTOR.
LAWRENCE R. SPERBERG
BY
MARCUS L. BATES

United States Patent Office 3,490,274
Patented Jan. 20, 1970

3,490,274
METHOD AND APPARATUS FOR CONTROL AND SIMULATION OF FORWARD, TRANSVERSE, AND VERTICAL FORCE CONDITIONS FOR VEHICLES
Lawrence R. Sperberg, 6740 Fiesta Drive, El Paso, Tex. 79912
Filed Jan. 5, 1968, Ser. No. 695,952
Int. Cl. G01m 17/00
U.S. Cl. 73—116                                   35 Claims

ABSTRACT OF THE DISCLOSURE

A method and apparatus for testing automotive components under varying simulated conditions of power requirements. The invention includes means of providing induced drag, induced transverse loads, as well as induced vertical loads to the vehicle to thereby cause the vehicle power plant to selectively expend power which is exerted in these various directions, while maintaining a particular speed or r.p.m. and constant power output. Accordingly, the components of the vehicle may be caused to operate under more strenuous conditions as though the vehicle were travelling at a higher rate of speed than is actually experienced by the vehicle. The apparatus therefore provides a method by which a slowly travelling vehicle may duplicate the power output required as though the vehicle were travelling at a greater speed, along a slope of continuous inclination, under constant side thrust and while carrying greater or lesser weight. In carrying out the present invention, a new apparatus is provided for practicing the method of inducing these varying amounts of force into the vehicle. The apparatus is adjustable and controllably interconnected with the power plant of the vehicle in a manner to maintain a constant power output from the vehicle power plant and accordingly sustain a constant predetermined torque application to the various mechanical components. The different apparatus of the present invention include parasitic drag producing means, rudders for inducing transverse forces, and elevators for selective application of vertical forces. Other embodiments of the drag producing means contemplated by the present invention include a trailer mounted wheel driven hydraulic pump having means associated therewith for varying the amount of work which the wheel performs upon the pump, as well as a generator device associated with the front wheel of the vehicle.

BACKGROUND OF THE INVENTION

Tires react to forces. Their reaction to applied forces regulates how they will perform during their useful life and in what manner they will die. Tires of different construction features react differently to identical force applications. Differences in reaction to identical applied forces of individual like tires selected from a large population of similar tires represent variations in quality attributable to the established permissible manufacturing limits for that particular tire.

The force applied upon any tire can be resolved into its three component parts—forward, transverse, and vertical. Vertical forces are primarily the result of vehicle applied load, tire inflation pressure, upward thrust of the road surface upon the tire and the aerodynamic characteristics of the vehicle upon which the tire is mounted. On a smooth pavement the upward thrust of the supporting road surface upon the tire tread contact area is uniform across the contact surface. On rough irregular road surfaces (a stone on a hard paved surface is also an irregular road surface), the upward vertical thrust is irregular across the contacting surface area with the greatest thrust being at the points of protrusion existent on the otherwise flat plane upon which the tire works. Of the total force application to which a vehicle tire is subjected in normal service, the vertical component amounts to roughly 10% of the total.

Transverse forces imposed upon a tire result from a change in direction of travel of a tire from one line of travel to another. This change in direction is generally caused by two factors—steering the vehicle and cross winds. In steering a vehicle the direction of travel of the front wheels is changed with respect to the fixed back wheels. If front an rear wheel traction is maintained, the vehicle is brought around the curve successfully. It is emphasized that in steering a vehicle around a corner it is essential that the front wheels slip somewhat (or lose traction) otherwise it would be impossible to change the direction of the line of travel. When a vehicle is subjected to a strong crosswind transverse to the vehicle's forward line of travel, it is necessary to turn the front wheels into the wind and to "crab" the vehicle in much the same manner as an airplane crabs into the wind in order to maintain a fixed line of travel with respect to the ground surface. Thus, a strong cross-wind results in the application of the same forces which are existent when a vehicle transverses a curve. The lower the radius of the curve being negotiated, the greater is the side thrust or transverse force, and the greater the speed employed in negotiating any curve the greater is the transverse force. In normal vehicle operations the loss in durable life because of transverse forces accounts for roughly 10% of the total life of a tire. When extremely gusty and strong side winds are encountered, the transverse forces may account for 40% or more of the total. When extremely curving roads are negotiated at high speeds the transverse force may account for 80 to 80% of the total.

The major force component to which a tire is subjected is the forward force. Backward forces due to braking action are simply negative forward forces. The forward force exerted by a vehicle is opposed by resisting forces of wind, frictional forces within the vehicle itself including the tires, and the change in potential energy resulting from a change in the effective vertical position of the vehicle. The resisting wind force is the sum of the actual wind force itself plus the resisting surface presented by the vehicle as it moves against the air. The resisting wind force of a vehicle is directly related to the frontal area and velocity of the vehicle in an exponential manner, specifically the square of the velocity. As a vehicle moves in a forward direction the tires which support the vehicle must flex, and in flexing they consume energy. As a vehicle goes up a hill its potential energy changes and the work performed in changing the potential energy of the vehicle is of major importance. While a change in the potential energy of a system due to its change in position may be confusing to some who may say that this accurs in a vertical plane or line, it is emphasized that this change in potential energy relates to the entire mass of the vehicle and its component forces and has no effect upon the vertical deflection of the tire. The work required to overcome a change in height is therefore reflected as a forward force. Forward forces in normal service application generally account for about 80% of the total force to which a tire is subjected.

In my copending applications Ser. No. 695,959, filed Jan. 5, 1968, a method for measuring and assessing the composite effects of forward, transverse, and vertical forces upon a tire is discussed. The measurements obtained are directed at determining the instantaneous torque forces existent at any moment under any condition of service as well as the integration of the torque forces measured into power and work functions. Typical data for a passenger tire indicate torque forces in excess of 200 foot pounds per drive tire to be exceeded under certain steady state conditions of severity. This value would be markedly exceeded if added torque due to acceleration were considered. Even under normal conditions of usage at a 70 m.p.h. speed, torque values of 125 ft. lbs. are normally obtained and this value will increase substantially if the vehicle were to be accelerated. Thus in the ordinary passenger car service application torque forces at the tire tread road interface equal and exceed 200 foot pounds. In contrast the torque exerted at the interface of a passenger tire impressed upon a steel wheel ⅓₀₀ of a mile in circumference and rotated at a peripheral velocity of 60 to 80 m.p.h. will rarely exceed 30 foot pounds and generally is in the neighborhood of only 15–20 foot pounds. While the exerted torque force changes almost quantitatively with the change in the applied load it is evident that the application of a 50% overload on the tire will increase the torque from 15–20 to 23–30 foot pounds. Obviously, if a correlation between road and indoor wheel tests on pneumatic tires is to be achieved it cannot be accomplished by increasing the load, decreasing the inflation pressure, or by increasing the angle of slip between the tire and the steel drum. It is therefore necessary that torque be applied to the tire by forcing the tire being tested to work against a resisting force such as a turbine or generator which easily dissipates the energy imparted to it by the tire.

In testing automotive components, and especially pneumatic tires, it is desirable to provide the pneumatic tires thereof with a constant applied torque wherein the torque is of a predetermined value which may be related to the applied torque of a multiplicity of other pneumatic tires previously tested and to be tested. This desired condition of constant torque is almost never realized in practice since there are few geographical locations where a vehicle can be driven over terrain that permits such a constant application of torque. Even under the most favorable geographical locations, variations in wind velocity as well as slight variations in road grade ordinarily cause varying mounts of torque to be applied to the pneumatic tire. Tests conducted by driving the vehicle in a circle encounter variations in torque because of wind variation.

The useful work produced by the vehicle power plant is ultimately transmitted to the pneumatic tires which support the vehicle. A measurable amount of the produced work is dissipated in friction losses and the like and therefore is never applied as torque to the pneumatic tires. The remaining torque that is applied to the tire is predominately dissipated by the force exerted between the road surface and the tread wearing compound of the tire. This last named dissipation of energy causes the rubber tread surface to be slowly abraded away, and accordingly, this abrasion represents still another loss in power. As the tire rolls along the surface of the ground, the side walls, and especially the upper buttress area are subjected to considerable deformation each revolution of the tire. Furthermore, slight irregularities in the surface of the road produces other flexing motions of the tire. The flexing of the tire generates considerable internal heat energy that must be dissipated from the tire, with the generated heat representing another expenditure of part of the available power.

The amount of horsepower, or work, required by the power plant of a vehicle therefore depends upon friction losses of the various moving mechanical parts of the vehicle, the amount of parasitic drag induced because of the wind resistance which tends to retard the moving vehicle, the road grade conditions, change in velocity of the vehicle, the weight of the vehicle, as well as the inflation pressure of the tire; and slippage, or wiping wear, such as brought about when a vehicle is turning. Accordingly, a vehicle travelling at a constant velocity along a road having a constant grade condition, and under constant wind conditions will require a specific amount of horsepower to propel the vehicle in this manner. Change in any of the foregoing factors requires a change in the power input to the vehicle or to the tire.

In testing pneumatic tires, the vehicle must travel along roads having constantly changing grades as well as varying wind conditions. These two factors cannot be duplicated from test to test since the human element is involved in the first condition of overcoming grade conditions, and accordingly, the magnitude and time interval of the various power applications that one individual will use over a specific test route will never duplicate the actions of another individual; or for that matter, the same individual, should he retrace the identical test route during a subsequent test. Conditions of wind velocity can never be duplicated unless the tests are restricted to no-wind conditions, which obviously is impractical.

SUMMARY

In testing pneumatic tires, the test results are often misleading or misinterpreted because of failure to recognize the effect of non-uniform torque application to the tire. The effect of variations in wind velocity and change in road grade condition introduces extreme variations in the torque applied to the pneumatic tires. Application of power by the driver is another variation which provides inconsistent torque application to a pneumatic tire.

For example, in comparing the results of wear and durability tests conducted on vehicles, the front free-wheeling tires show minimum degradation relative to the driven rear tires. Accordingly, the application of constant torque to the tires of a vehicle gives tests results that are more meaningful and reproducible and allows the careful study and proper correlation of test results conducted on pneumatic tires.

Constant torque application to pneumatic tires is made possible in accordance with the present invention by the provision of variable force inducing apparatus wherein the magnitude of the induced force may be selectively changed to compensate for wind effect, grade condition, centrifugal force, load, and driver errors (misapplication of torque).

The application of constant torque is made possible by wind resistance devices, transverse force devices, vertical force devices, as well as drag induced by trailer mounted drag producing means and drag induced by means associated with the front wheels of a vehicle. The magnitude of induced force is varied in a manner to permit a constant vehicle speed with the power output remaining constant.

The force producing apparatus of the present invention permit the simulation of constant grade conditions as well as enabling high speed tests to be carried out at lower actual speeds. Driver errors are reduced to a minimum since the vehicle power plant is automatically controlled.

It is therefore a primary object of this invention to provide a method of testing pneumatic tires under conditions of constant torque application.

Another object of this invention is the provision of a method of testing pneumatic tires wherein a predetermined specific road grade condition can be simulated.

Another object of the present invention is the provision of a method of testing tires wherein various velocities of the vehicle may be simulated at lower actual vehicle speeds as regards power throughput.

A still further object of the present invention is the provisions of a method of testing pneumatic tires wherein a specific amount of drag is introduced to thereby cause a predetermined amount of power application to be extracted from the vehicle power plant.

Another object of this invention is the provision of a method of testing pneumatic tires wherein the effect of varying grades, curves, and wind velocity upon a tire can be substantially eliminated by variation of induced forces.

In carrying the above method into practice, several embodiments of various apparatus are set forth in detail herein which are also considered to be part of this invention. Accordingly, a still further object of this invention is the provision of a device which imparts varying amounts of force into a vehicle to thereby enable a predetermined amount of power to be applied to the drive wheel of the vehicle, which is not proportional to the vehicle speed.

Therefore, another object of this invention is the provision of a wind resistant apparatus which is adapted to be extended into the slipstream of a vehicle to thereby increase the drag normally associated with the vehicle.

Another object of this invention is the provision of a sensing means associated with the power plant of an automobile which controllably regulates the amount of force induced into the vehicle by additionally actuating a force producing device in a manner to thereby enable constant application of force to the tires of the vehicle.

Still another object of the present invention is to provide variable force producing apparatus on a vehicle which maintain a predetermined vertical, longitudinal, and transverse force applied thereto.

Another object of the present invention is the provision of a new combination which includes means for actuating variable force producing apparatus in a manner to maintain a predetermined force applied to a vehicle.

A further object of this invention is to provide a means for weighing a vehicle while it is travelling down the road.

Another object of this invention is to provide means for actuating a rudder device in response to the steering mechanism of a vehicle.

A further object of the instant invention is the provision of a force producing apparatus which is in the form of pairs of rudders, which cooperate together in a manner to provide variable induced drag while at the same time offsetting side thrust to which the vehicle may be subjected.

Another object of the present invention is the provision of a drag producing apparatus which induces a predetermined amount of force into a pneumatic tire which is being tested on an indoor test wheel.

The above objects are carried out in accordance with the objects of the present invention by the provision of an adjustable force producing apparatus which may take on several different forms as illustrated in the various embodiments detailed in the remainder of this disclosure. The force producing apparatus is controllably actuated in accordance with the power output of the vehicle to thereby maintain a constant torque application to the tread surface of the vehicle, while the vehicle maintains a constant velocity under predetermined conditions of lateral, vertical, and longitudinally induced forces.

Other objects and advantages of the present invention will become more apparent when the remainder of the entire disclosure, including the present specification, drawings, and claims are considered.

BRIEF DESCRIPTION OF THE DRAWINGS

FIGURE 6 is a modification of the devices seen in FIGURES 1 through 5;

FIGURE 7 is a side view of another modification illustrating one form by which the present invention may be practiced;

FIGURE 8 is an enlarged partial cross sectional view taken along line 8—8 of FIGURE 7;

FIGURE 9 is a partial side view of a modification of the device seen in FIGURE 8;

FIGURE 10 is a further modification of the device illustrated in FIGURES 8 and 9;

FIGURE 11 is a schematical representation of a control system which may be used in conjunction with the foregoing figures;

FIGURE 12 is also a side view showing another embodiment of various drag devices of the present invention as they may be attached to an ordinary vehicle;

FIGURE 13 is a diagrammatical, partly schematical illustration of one embodiment of a combination of various pneumatic circuitry which can be used to integrate the various devices associated with the present invention into a single vehicle;

FIGURE 14 is a schematical representation of part of the apparatus associated with the vehicle of FIGURE 12;

FIGURE 15 is a schematical representation of part of the device seen in the foregoing figures but with the device in a different operative position;

FIGURE 16 is similar to FIGURE 15, but with the drag device in still another configuration;

DESCRIPTION OF THE PREFERRED EMBODIMENTS

Figure 1:
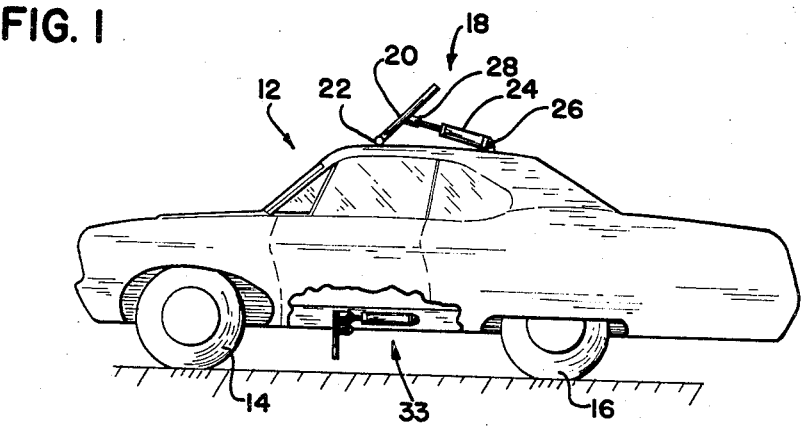
FIGURE 1 is a side view showing two different applications of the present invention to an ordinary passenger vehicle.

FIGURE 1 generally illustrates a vehicle 12 which is suitably supported by front wheels 14 and rear wheels 16 in the conventional manner. A drag device, generally illustrated by the arrow at numeral 18, is secured to the vehicle in a manner to permit part of it to be disposed externally thereof. The drag device includes a movable flap member 20 which pivotally rotates about journal 22 when actuated by a hydraulic cylinder 24. The hydraulic cylinder is pivotally fixed at 26 and includes a piston having a piston rod pivotally attached to the flap at 28. The flap may be extended into the slipstream in the illustrated manner of FIGURE 1 or retracted into the low-drag position seen in FIGURES 2 and 3. The flap 20 may advantageously be slotted at 30 to provide accommodation of the actuating cylinder to thereby present a minimum frontal area.

While the flap is illustrated as being made apart from the vehicle, it is considered within the comprehension of this invention to fabricate the flap whereby it is a portion of the vehicle.

Figure 2:
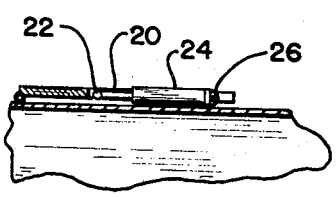
FIGURE 2 is a fragmentary representation of the vehicle seen in FIGURE 1 and shows one of the drag devices associated with FIGURE 1, but in the retracted position.
Figure 3:
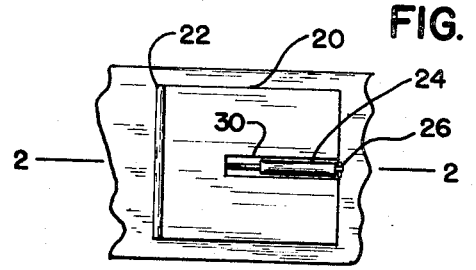
FIGURE 3 is a top fragmentary representation of part of the vehicle of FIGURES 1 and 2 and shows one of the drag devices in retracted position.
Figure 4:
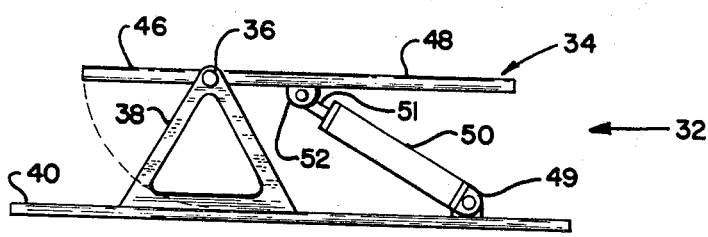
FIGURE 4 is a side view of another drag device by which the present invention may be practiced, and which may be used on a conventional vehicle.
Figure 5:
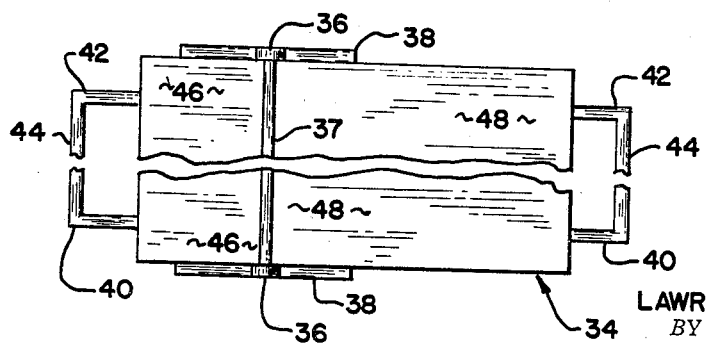
FIGURE 5 is a top view of the device seen in FIGURE 4.
Figure 17:
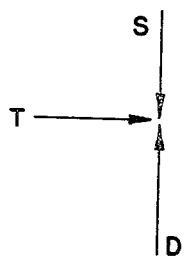
FIGURE 17 is a pictorial analysis setting forth one concept of the resulting forces existent in conjunction with FIGURES 14 through 16.

FIGURES 4 and 5 illustrate a drag device 32, similar in some respects to the drag device seen in FIGURES 1 through 3. Drag device 32 includes a balanced flap 34 suitably journaled at 36 to an upstanding reinforced pair of spaced apart struts 38. The struts are rigidly attached to a framework 40 which in turn is suitably mounted to the vehicle in a manner similar to the mounting of the embodiments of FIGURE 1. The framework includes spaced apart longitudinally extending side members 40 and 42 which are tied together by a multiplicity of lateral members 44 to thereby provide means of transferring the forces exerted against the flap into the body of the vehicle. The flap 23 is aerodynamically balanced about the journal 36 and includes a first portion 46 and a second portion 48 with the portion 46 being of a configuration to be received between the spaced apart strut members 38. A lug 49 is rigidly affixed to one of the lateral members 44 to thereby provide a mounting means for hydraulic cylinder 50. A conventional piston depends from the cylinder 50 in the form of an actuating piston rod 51 which is pivotally affixed to the flap by a second lug 52. As seen at 33 in FIGURE 1, the struts 38 may be attached to the frame of the vehicle rather than members 40, 42 when it is desired to mount the device below the body of the vehicle.

FIGURE 6 shows another embodiment of the drag device. The drag device is attached to vehicle 53 in any suitable manner and includes a streamlined fixed portion 54 having a contoured movable member 55 suitably journaled at 56 to form a vertically extending complementary seam, or interface, at 57 when the device is in the closed position. Numeral 58 indicates the configuration of the device when it has been moved to the fully opened position.

FIGURES 7 and 8 illustrate another embodiment of the present invention wherein the drag device is trailer mounted for convenience. The trailer 70 is conventional in external appearance and includes a trailer hitch 71, spaced apart pneumatic tires 73 attached to spaced apart wheels 72, and an axle 74. As seen in FIGURE 8 stator 75 is rigidly affixed to the axle by means of a plate 76, and further includes the illustrated electrical conduits having a variable resistance associated therewith. A rotor 78 cooperates with the stator and forms a part of the wheel 73. Lug bolts 79 removably fasten the before mentioned wheel 72 to the rotor.

FIGURE 9 illustrates the manner in which the drag device of FIGURE 8 can also be included on the front wheel assembly of a conventional vehicle. A spindle 60, which forms part of the front suspension system carries an axle 62 in the conventional manner. A brake drum 64 having a multiplicity of lugs 65 circumferentially disposed thereabouts in the conventional manner permits the inclusion of a standard brake shoe in the area generally indicated by the arrow at numeral 66. Numeral 68 schematically illustrates a circumferentially disposed rotor. A stator 69 is arranged in close proximity to the rotor 68. The stator 69 includes a variable resistance (not shown) such as illustrated in conjunction with FIGURE 8 to allow a variable electrical load to be placed on the generator.

FIGURE 10 illustrates a hydraulic drag producing device 80. The device includes a pneumatic tire 82 suitably suspended from axle 83, and has a pump housing 84 which is mounted in fixed position with respect to the axle. A hydraulic fluid containing reservoir 85 includes an inlet 86 having a flow control valve 87 therein, a bypass valve, and an outlet 89. Located within the pump housing 84 is a hydraulic pump rotor rigidly attached to the rotating wheel.

FIGURE 11 is a schematical representation of a pneumatic control circuit which may be used in controlling any of the before described drag devices. The pneumatic circuitry 90 includes a power sensing portion 91 and a drag adjusting portion 92. The power sensing portion includes reciprocating shaft 93 which is longitudinally moved as the r.p.m. of the power plant increases. Shaft 93 is journaled to linkage 94, 95, and 96 in the illustrated manner. Shaft 95 is connected to the illustrated piston which moves to the right upon the manifold pressure of the engine being decreased. Shaft 96 is connected to regulator means 97. Regulator 97 is connected to control fluid flow from the manifold of the engine, which provides the drag device with a power source in the form of a vacuum. Shaft 96 positions regulator 97 to thereby provide a regulated pressure source which is proportional to the power delivered by the engine. Conduit 98 is open to the atmosphere by means of the indicated capillary tube to provide a constant bleed-down or reset for the pneumatic circuitry. T-connection 99 is also connected to the piston and cylinder arrangement 100 and includes a piston shaft 102 which is suitably journaled to a drag producing means in the form of the flap 104. The flap 104 is journaled to the vehicle at 106. It should be understood that the piston shaft 102 can alternatively be used to actuate the control valve or rheostat of FIGURES 8 or 10.

Looking now to the details of FIGURE 12 wherein there is seen a vehicle, similar in some respects to the one disclosed in FIGURE 1, but with the wheels being removed in order to better illustrate some of the teachings of the present invention. Located below the vehicle are a pair of elongated rudders pivotally mounted to a forwardly located portion of the vehicle frame. Rearwardly located below the vehicle is a second pair of spaced apart rudders 218 likewise pivotally mounted to the vehicle frame at 220. Sufficient clearance is left between the bottom of the rudders and the surface of the ground as indicated by the arrow at numeral 222. Located above the rear window is an airfoil in the form of an elevator 224 which is pivotally mounted to a suitable trunnion 226. Located at the extreme forward portion of the vehicle is a second lifting airfoil in the form of an elevator 228 similarly pivotally mounted to a trunnion 230.

Looking now to the details of FIGURE 13 and further to FIGURES 14–20 wherein there is set forth a part diagrammatical, part schematical, pneumatic circuitry which sets forth one form of a device which enables the practice of the entire combination of the present invention. As seen in FIGURE 13, the source of pneumatic air pressure S provides a flow of pressurized gas to a common point 232 which in turn provides conduits 233, 234, 235, 237, and 238 with pneumatic pressure. A steering wheel assembly is seen at 240 having the usual gearbox 242 which may be of any suitable design. Slidably affixed to and enclosing the shaft of the steering wheel are spaced apart cams 314, 316 which are attached to the steering shaft by means of a clutch assembly, as will be explained in greater detail later on. Numeral 243 schematically illustrates the flapper actuated set of pilot valves which control the pressure in conduits 244, 246. The last named conduits are connected to the pilot actuated valve 248. Valve 248 receives a regulated constant pressure fluid source at 233, and provides a flow or pressure at 250, 252, and 250', 252' which is proportional to the pressure within conduits 244, 246. Conduits 252, 252' connect to either side of the piston located within each of the illustrated cylinders 253, 254. Each of the cylinders are attached to a portion of the frame while the piston is attached in a manner to actuate the rudder through movement of the entire cylinder 268. This action simultaneously moves both rudders independently of cylinder 268. Likewise, conduits 250, 250' connect to either side of the piston located within cylinder 254, wherein cylinder 254 is attached to a member of the frame, while the piston has a rod attached to its corresponding cylinder 268. It should be understood that actuation of pistons 253 or 254 causes the fore and aft rudders, respectively, to pivotally rotate about their respective journals, while at the same time, actuation of the pistons within cylinders 265, 268 produces drag.

Looking now to the details of flow path 234, there is seen a flow meter 259 which measures the rate of flow of fuel F therethrough and sends a flow responsive signal to motor valve 260 which is opened an amount which is proportional to the flow of fuel through the meter and to the power plant. Conduit 261 is provided with pneumatic pressure from conduit 234 which is proportional to the before mentioned flow of fuel. Conduit 261 branches into conduits 262, 263 whereupon conduit 262 is connected to one side of the piston located within cylinder 265, in a manner amply illustrated in the drawings. The piston rod is journaled to the rudder at 264, while the cylinder is journaled to the opposite rudder at 266. Atmospheric bleed down 268 maintains one side of the cylinder at atmospheric pressure. Similarly, conduit 263 provides one side of the piston of cylinder 268 with a pressure source. The piston rod is attached to the rudder 218 and the cylinder to the rudder 218'. One side of the cylinder 268 is also provided with an atmospheric bleed down.

Looking now to the details in which elevators 224 and 228 are actuated, there is seen a flow control valve 270 which receives a source of pneumatic pressure at 237 which permits a flow therethrough that is proportional to the weight of the vehicle 212 with the weight being measured by means associated with the relative position of the differential 276 with respect to the main vehicle frame 280. The differential is sprung to the main frame by the usual means, such as a main spring 278. The arrow at numeral 282 illustrates a dampened measuring device which maintains the pressure within conduit 283 at a value which is proportional to the measured distance between the differential 276 and the main frame 280.

Conduits 284, 284' receive a regulated pressure from source 237 which is proportional to the weight of the vehicle with each conduit being located on opposite sides of a piston located within cylinder 286. The piston actuates the elevator 224 in a direction which maintains the dynamic weight of the rearward portion of the vehicle at a predetermined constant value, usually selected to equal the static weight of the vehicle.

Looking now to the details of the forwardly located elevator 228, there is seen a pressure regulated flow control valve 272 which provides a controlled source of flow from conduit 238 with the flow being proportional to the signal received at conduit 274. Conduit 274 is provided with a regulated pressure which is proportional to the weight of the front of the vehicle. The front of the vehicle is provided with a flapper actuated pilot control valve, similar to valve 282, which is attached to any convenient portion of the front suspension system which moves relative to the weight of the front of the vehicle.

Figure 18:
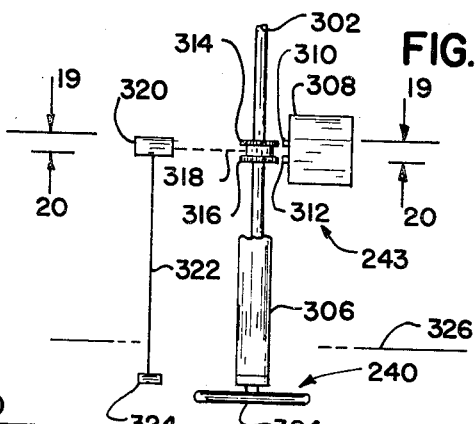
FIGURE 18 is an enlarged fragmentary representation of part of the device seen in FIGURE 13.

Looking now to the details of FIGURE 18 wherein there is seen an enlarged fragmentary view which sets for the essential details which are considered necessary for an understanding of the operation of rudders 214 and 218. As seen in FIGURE 18, steering wheel 304 is suitably housed in the usual manner at 306. Valve housing 308 has reciprocating fingers 210, 212 protruding therethrough and biased into engagement with spaced apart cams 314, 316. Cams 314, 316 are slidably attached in a rotational manner to steering shaft 302 in high frictional relationship therewith so as to enable both cams to rotatably slide with respect to shaft when sufficient force is exerted therebetween. Drive means 318, which may be in the form of a chain or any other suitable power transmitting means is operatively attached to gear and sprocket arrangement 320, which in turn is rotatably attached to shaft 322. Handle 324 enables sprocket 320 to rotatably turn the spaced apart cams with sufficient force to overcome the beforementioned clutch. The firewall of the vehicle is seen at 326.

Figure 19:
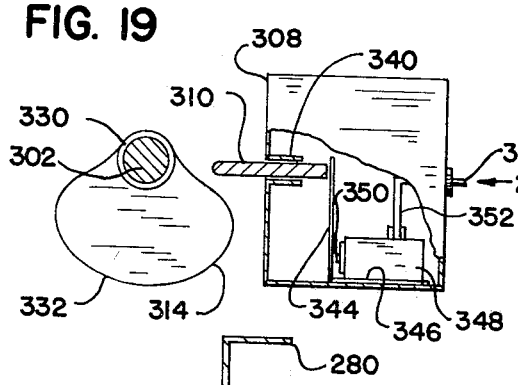
FIGURE 19 is an enlarged, part cross sectional view, taken along line 19—19 of FIGURE 18.
Figure 20:
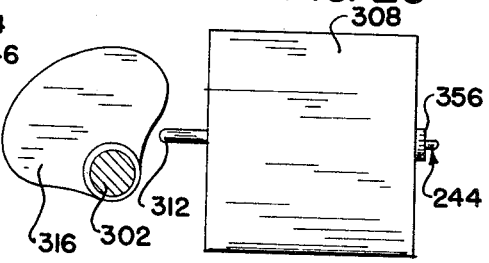
FIGURE 20 is a part cross sectional view taken along line 20—20 of FIGURE 18.

Looking now to the details of FIGURE 19 which sets for the manner in which the finger 310 sends a regulated source of pressure to the flow valve which actuates the rudders in response to the position of steering wheel 304. As seen illustrated therein, cam 314 is contoured to provide a camming action which reciprocates the finger. Clutch 330 is rigidly attached to both the spaced apart cams in order to maintain the same relative position of each cam with respect to each other, such as shown in FIGURES 19 and 20. Sleeve 340 receives the reciprocating finger which moves flapper valve reed 344. The reed is attached to the housing 308 at 346 by means of the valve body 348. Nozzle 350 of the pilot valve cooperates with the reed in the usual manner. Conduit 352 is provided with a suitable connection at 354 which provides the beforementioned regulated pressure source 246. Since the operation of the second flapper valve is substantially identical to that of FIGURE 19, except for the rotation of wheel 304, further explanation of FIGURE 20 is deemed unnecessary.

Figure 21:
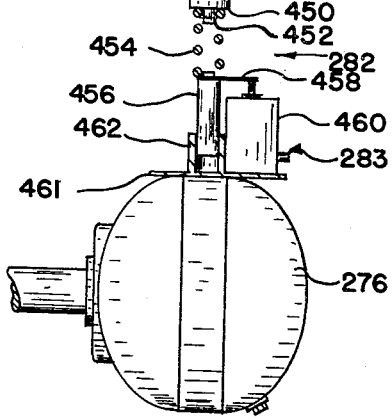
FIGURE 21 is an enlarged fragmentary representation of part of the device seen in FIGURE 13 with some parts being cut away and shown in section in order to better illustrate the device.

Looking now to the details of FIGURE 21, there is seen illustrated therein the beforementioned weight means 282. The measuring apparatus is attached between the differential 276 and frame member 280. Adjustment 450 which may be either manual or motor-driven, enables rod 452 to be movably positioned with respect to frame 280. Spring 254 is attached to the rod and to the piston 456. Flapper valve actuating lever 458 actuates the flapper valve against a nozzle located within 460, all in a manner known to those skilled in the art. The cylinder 462 is provided with an atmospheric bleed in the form of a needle valve, to thereby control the rate at which piston 456 is moved when spring 454 vertically biases it in either direction. Any suitable pad 461 may be used to attach the entire device to the differential.

Figure 22:
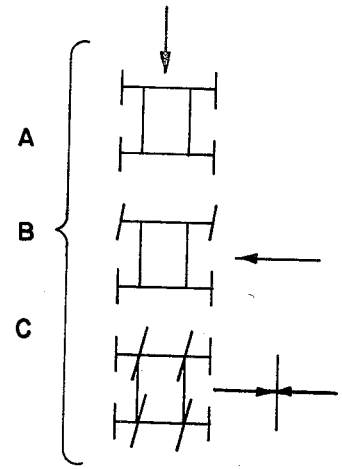
FIGURES 22A, B, C diagrammatically illustrates the effect of wind velocity upon the vehicle of FIGURE 12.

FIGURE 22A shows a vehicle travelling down a level highway and having no crosswind. FIGURE B shows a crosswind which is forcing the front wheels to be turned to the right in order to overcome the sidethrust produced by the wind. FIGURE C shows how the present invention can be utilized to provide an equal and opposite force to overcome the effect of the wind.

OPERATION

In the operation of the embodiment of FIGURE 1, viewed in conjunction with the remaining figures, there is seen illustrated a conventional vehicle 12 having a drag device, generally indicated by the arrow at numeral 18, rigidly affixed to the top thereof. The drag device includes a flap member 20 which is movable from an extended position such as seen in FIGURE 1 to a retracted position as illustrated in FIGURES 2 and 3. The retracted flap device of FIGURE 2 offers negligible resistance to the air flow over the streamlined body of the vehicle. As the flap member 20 is extended into the slipstream, the parasitic drag of the vehicle body is increased in proportion to the induced drag provided by the extended device. The amount of induced drag provided by the device 18 generally exceeds the wind resistance attributable to the increased frontal area of the flap device since extension of the device into the slip-stream also disturbs the laminar flow of air over the streamlined body of the vehicle. For example, assuming the vehicle body to have a coefficient of drag equivalent to 0.061, which is the drag coefficient for a streamlined body; the flap member 20, when extended into the airstream, changes the coefficient of drag from 0.061 to a value approaching 1.25, which is the value of a flat surface. Therefore, the induced drag provided by flap member 20 not only depends upon the increased frontal area provided by the flap member, but also includes the drag brought about by disruption of the normal laminar flow of air over the vehicle body. The increased parasitic drag induced into the vehicle therefore must include both of these factors.

The flap device 20 is provided with a cut-out 30 in order to permit the flap device to be retracted into the position of FIGURES 2 and 3 where it lies closely adjacent to the roof of the vehicle when in the low drag condition. Cylinder 24 may be actuated by either air pressure or hydraulic pressure, and it is considered within the comprehension of those skilled in the art to provide other mechanisms for actuation of the drag device while still remaining within the limits of this invention.

The drag inducing device of FIGURE 4 includes a flap member 34 which is aerodynamically balanced in order to permit the use of a relatively small hydraulic cylinder 50. The flap member 34 is illustrated as being in the streamlined position and is movable into a vertical position upon extension of piston rod 51. The frame 40 can be directly attached to the roof of a conventional vehicle in the same manner as illustrated in FIGURE 1 if desired; or alternatively may be located below the vehicle body as indicated by the arrow at numeral 33.

In the embodiment of FIGURE 6 the drag device is made into the configuration of a streamlined body to thereby offer a low drag profile having a drag coefficient assumed to be 0.061 when the device is in the retracted position. Upon extension of member 55 into the position indicated by numeral 58, the induced drag changes from the coefficient of 0.061 (for the frontal area represented by the retracted device) to a drag coefficient thought to be 1.33 (for a frontal area twice that of the device when it is in its retracted position). The rotatable member 55 is actuated from the opened to the closed position, and vice versa, by means of the illustrated hydraulic cylinder, although other actuating means are also contemplated by the invention.

Under some test conditions it is permissible to tolerate the presence of a trailer towed behind the vehicle. In such an instance the drag device is advantageously incorporated into the trailer. In order to regulate the magnitude of the induced drag it is necessary to control the load, or work, of the drag producing device associated with the trailer. As seen in FIGURES 7 and 8 the wheels of the trailer are provided with a rotor 78 and a stator 75 which are similar to the rotor and stator of an electrical generator. The output of the generator is directly connected to a vehicle resistance or shunt, wherein the variable resistance can be adjusted to select the amount of power or torque required by the tires of the trailer wheels. Alternatively, the wheel 73 may be provided with a chain and sprocket arrangement to drive a conventional generator located within the bed of the trailer 70.

The free-rolling front wheel 14 of a test vehicle subjects a pneumatic tire to an entirely different set of conditions as compared to the driven rear wheel, 16, for example. Since a free rolling front wheel is subjected to substantially no torque, it is therefore advantageous to provide the front wheel with a torque producing device such as seen in FIGURE 9. In such an instance, the torque induced into the pneumatic tires associated with the front end assembly can advantageously be used to provide a drag for the same purpose as described in conjunction with the foregoing figures. Such an expedient may be carried out in accordance with the details of FIGURE 9, wherein the brake drum 64 is provided with a rotor 68 which cooperates with a stator 69 to thereby generate an electrical current which may be dissipated as heat energy by the use of a rheostat in the same manner as illustrated in FIGURE 8. Since the stator 69 is attached to the spindle 60 the basic design of the front end suspension system is not unduly changed. In lieu of a conventional brake assembly (not shown) normally mounted at 66, it may be deemed desirable to utilize dynamic braking by taking advantage of the relationship between the rotor 68 and the stator 69.

Where deemed desirable, a hydraulic pump assembly may be substituted for the generator apparatus as illustrated in FIGURE 10. The pump housing 84 is directly attached to the fixed axle member 83, with the pump rotor being inclosed within the housing 84 and driven by the rotating pneumatic tire 82. The amount of work provided by the tire 82 can be adjusted by means of the illustrated valves, one of which is seen at 87. The reservoir 85 may be placed in any convenient location as desired.

It will now occur to those skilled in the art to provide a four wheel drive vehicle with drag devices by incorporating a drag device such as a hydraulic torque converter or a generator into the front wheel line drive shaft, with the shaft being disconnected from the transfer case. Such an expedient is considered to fall within the comprehension of the present invention. In providing a front wheel drive system with a drag device, there is made available a means by which the torque applied to the rear driven wheels by the power plant can be regulated. Furthermore, since the drag device associated with a front wheel suspension system can be absolutely regulated, such an expedient provides a tire test procedure wherein a constant torque for any period of time may be applied to the forwardly located pneumatic tires. It should be understood that when practicing the invention by this expedient, the front wheels are not utilized to drive the vehicle; that is, the line drive shaft to the forwardly located differential is not connected to a transfer case, but instead is connected to a torque producing means such as illustrated herein.

In the operation of FIGURE 11, the power plant of the vehicle is preferably provided with a governor for the purpose of maintaining a constant predetermined velocity of the vehicle. Accordingly, any increase or decrease in power required by the vehicle in order to maintain a constant velocity will not be reflected as a change in torque on the driven wheels since the change in induced drag provides the necessary change in power required by the vehicle as varying road grades and wind velocity is encountered by the vehicle. The torque applied to the tires therefore remains constant. Accordingly, as the governor tends to change the throttle setting on the engine in order to maintain constant r.p.m., a small change in r.p.m. or manifold pressure will be sensed at 93 and 95 respectively, to thereby move member 96 in response to these slight changes in the power output of the engine. Rod 96 actuates pressure regulator 97 in a manner that a call for increased power (i.e. slight reduction in r.p.m. or increase in manifold pressure) changes the pressure in conduit 98 to thereby retract flap 104 an amount to fulfill the requirement for additional power by the reduction in parasitic drag. Conversely, when the governor tends to reduce the power, the pressure regulator 97 will be actuated in an opposite direction to thereby provide additional drag at 92 and accordingly maintain a constant power output from the engine and into the tires. The drag control device preferably utilizes a surge tank connected to the manifold of the engine to thereby provide a vacuum storage for the regulated pressure at 97. A capillary attached to the T at 99 provides constant bleed-down to enable reset of the vacuum operated cylinder 100. The piston of the cylinder 100 has one surface thereof open to the atmosphere and the opposite side connected to the T at 99 to thereby enable changes in the position of the piston in accordance with changes in the reduced pressure at 98. This operation positions the flap member 104, so as to maintain a balanced condition between the force of the wind against 104, and the pressure within conduit 98. Accordingly, a change in the pressure within the conduit 98 will produce a corresponding change in the parasitic drag produced by the device 92 since the regulator 97 provides a controlled pressure within conduit 98 which is proportional to the position of shaft 96.

It is considered within the comprehension of this invention to substitute the rheostat of FIGURE 8 or the control valves of FIGURE 10 for the drag producing device 104.

Looking now to the operation of the remaining figures, it will now be realized by those skilled in the art that the vehicle 212 is provided with air foils which induce drag for the same purpose as set forth in conjunction with the foregoing FIGURES 1 through 11, and which additionally overcome sidethrust and maintains the total weight of the vehicle constant regardless of the aerodynamic design thereof. The rudders 214 and 218 are placed fore and aft of the vehicle and in the optimum position wherein the spaced apart pairs of rudders may be employed to overcome the effects of both wind and sidethrust such as the centrifugal force produced by a moderate curve, or side load caused by wind.

The rudders cooperate together to provide a drag device while simultaneously inducing sidethrust. In FIGURE 14 for example, both sets of rudders 214 and 218 are shown as being turned to the right to thereby push the entire vehicle to the right, which is also the position of the rudders which is required to produce a transverse force in order to overcome a sidethrust from the right. This sidethrust may be the result of wind forces or the centrifugal force produced when rounding a moderate curve.

Assuming the vehicle is being driven upon a straight-away under a no wind condition, the rudders will be aligned longitudinally with the vehicle so as to produce no sidethrust. Upon descending a grade, however, each set of rudders will commence to pivot toward each other in the illustrated manner of FIGURE 15 in order to increase the induced or parasitic drag of the vehicle. The amount of induced drag is regulated in proportion to the fuel consumption of the vehicle since the purpose of a drag device is to maintain a constant torque or power output at the tread surface of the rear tire.

Assuming the vehicle to be descending a grade while at the same time it is being subjected to a sidethrust, in order to maintain constant longitudinally directed forces upon the vehicle the rudders must simultaneously induce more drag into the vehicle by turning inwardly toward each other while at the same time providing the required transverse or sidethrust correction which is equal to the imposed sidethrust applied to the vehicle. This condition is best understood by viewing FIGURE 16 wherein condition D–D′ corresponds to FIGURE 14, condition E–E′ corresponds to a low drag no sidethrust condition of FIGURE 13, while condition F–F′ corresponds to the position of the rudders required to overcome a sidethrust from the right while at the same time producing additional induced drag. Therefore F–F′ is a combination of the rudder positions of FIGURES 14 and 15. It will now be appreciated by those skilled in the art that the rudders 214, 218 enable a constant drag to be maintained upon a vehicle, while at the same time providing a force which is equal and opposite to the sidethrust effects of wind and centrifugal force.

Vehicle bodies are designed more from an aesthetic viewpoint than from a functional one. Accordingly, various body styles will react differently as the vehicle is driven along the road. Some vehicles become lighter in weight as the velocity increases, while other vehicles are actually forced in a downward direction due to the resultant forces of the slipstream flowing across the body of the vehicle. In testing tires, the weight and balance of the vehicle is carefully analyzed and ballast placed at various critical locations in order to subject each individual tire to a predetermined stationary or static load. A vital factor overlooked by many tire testers is the dynamic weight of the vehicle, which as pointed out above, seldom equals the static load placed on the tires. Accordingly, the provision of lifting foils 224, 228 placed fore and aft of the center of gravity of a vehicle enables the effective weight of both the front and rear tires to be maintained constant by moving either the fore or aft airfoil into a lifting position or into a position which provides a downwardly directed force. In order to actuate the fore and aft elevators to the proper position which maintains the dynamic load equal to the static load, it is necessary to be able to measure the weight of a vehicle while it is traveling along the road at various velocities.

Measurement of the dynamic weight of a vehicle is carried out by providing a weighing device responsive to the weight of the vehicle near the front and rear axles. As seen in FIGURE 21, one means by which this can be accomplished is by measuring the average distance between fixed and moving parts of the suspension systems, such as the differential and a frame member. Since the suspension system of a vehicle is in continuous motion, this distance must be dampened in a manner to provide an average weight, for the instantaneous weight may vary considerably over a short period of time. This may be accomplished by the provision of a combination dash-pot and adjustable spring wherein the adjustable spring positions the location of the dash-pot piston which is proportional to the instantaneous weight of the vehicle. The piston of the dash-pot is therefore continuously biased in either an upward or downward direction in response to the vertical movement of the vehicle. This action averages out positive and negative forces imposed upon it by the movement of the suspension system and accordingly, by measuring this average distance, the weight of the vehicle can be continuously weighed. In other words, assuming the vehicle body design to impart zero lift to the body at 60 m.p.h., the average dynamic weight will equal the static weight, and the dash-pot piston will remain positioned with respect to the pilot valve as if the vehicle were not travelling. Road irregularities will cause movement between the vehicle body and differential, however, this movement will be averaged out by the apparatus, and this average will be the actual weight of the vehicle.

As seen in FIGURE 21, the vehicle frame 280 is suspended a specific distance above the differential with the specific distance being proportional to the static weight of the vehicle when the vehicle is at rest. It may therefore be seen that the rear suspension system may also be viewed as a weighing scale since the frame 280 is pressed into close proximity to the differential when a weight is imposed upon the rear of the vehicle, and vice versa for a decrease in weight. Therefore, all vehicles have a built-in weighing apparatus since the distance between the frame and the differential is proportional to the weight of the vehicle. As the vehicle travels along the road, the weight changes in accordance with the design consideration of the body—i.e., the flow of air over the vehicle body may either lift the vehicle or press it towards the ground. Therefore, the static weight of a vehicle usually does not equal the dynamic weight, and furthermore the dynamic weight may change with respect to the static weight and in proportion to the velocity of the air flow thereover. Accordingly, the carefully adjusted static weight which the tire tester imparts to his vehicle becomes a futile endeavor where the dynamic weight does not remain constant. In order to maintain the weight of the moving vehicle constant, it is necessary to continuously weigh the vehicle in order to add or subtract weight therefrom. The vehicle is weighed by taking advantage of two relative structural members associated with the vehicle which move with respect to each other as a direct function of the static or dynamic weight of the vehicle; i.e., the apparent weight. One means of accomplishing this expedient is illustrated in FIGURES 13 and 21, wherein a dampened spring 254 is adjustably attached to the frame and a dash-pot is secured to the differential. When the vehicle is in motion, the frame is continuously moving with respect to the differential, the spring and dash-pot cooperate to dampen out these variations to thereby measure the average load, which is used to adjust the flapper controlled pilot valve. The pilot valve maintains a controlled pressure within a pneumatic tube which is proportional to the distance between the frame and the differential. Further advantage may be taken of the apparatus of FIGURE 21 by the provision of the beforementioned means of adjusting the position of the spring of the weighing means, such as by the provision of motor 450 in which the vertically moveable adjusting rod 452 may be moved to thereby enable the operator of the vehicle to control the spring tension 454; or in other words, to change the total dynamic load of the vehicle as he may desire.

The controlled pressure at 283 is utilized in accordance with the teachings of FIGURE 13 in order to actuate the rear elevator device 224. Assuming the weight of the vehicle 212 to be of a design which increases weight with velocity, this dynamic change in the vehicle weight causes frame 280 to be moved closer to the differential. This action causes spring 454 to move the piston 456 in a downward direction. Flapper actuated valve 460 senses this change in position of piston 456, and accordingly changes pressure in valve 270, which in turn actuates the elevator 224 to a lifting position, thereby returning the piston to the previously determined static load position. On the other hand, should the vehicle body cause the dynamic weight of the vehicle to be less than the static weight, the piston 456 will be biased in an upward direction whereupon the rear elevator is actuated to a position whereupon the vehicle body is forced back to its original position.

The forwardly located elevator 228 is similarly actuated by a device substantially as disclosed in FIGURE 21, but wherein the device is positioned between a moveable and stationary member associated with the suspension system and vehicle frame respectively, such as the frame and spindle, or the A-frame to which the spindle is attached and the frame, or for that matter, in a position such as enjoyed by the front shock absorber of the vehicle.

At first glance it would appear that the relative movement between the frame and the suspension system is of too great a frequency and amplitude to provide any measure of accuracy. This frequency of movement as well as the amplitude thereof is overcome by the teachings of the present invention which provides a weighing means which is relative to both the dynamic and static weight of the vehicle.

Looking now to the details of the transverse force producing apparatus it must first be understood that a vehicle which is driving down a roadway under conditions of a side wind is actually crabbing since the steering wheel is forcibly held turned in a direction which overcomes the force of the wind, yet the vehicle instead of turning continues to travel straight down the road. This is exemplified in FIGURES 22A and B. The force of the wind against the side of a vehicle body is transmitted into both the front and rear tires, with only the front tires having the ability to impose an equal and opposite force to the tires of the vehicle in order to prevent the vehicle from drifting off the highway. Accordingly, since the steering mechanism must be utilized in overcoming the wind forces, advantage is taken of this readily available expedient in order to provide the vehicle with a transverse force producing means which is equal and opposite to sidethrust resulting from both wind and gentle curves. Analyses of the rudder devices of the present invention will show that a vehicle in negotiating a turn to the right will move each of the rudder devices in a direction whereby a force opposite to the centrifugal force is induced into the vehicle. This analysis is also true for a vehicle turning to the left, or for a wind force received from the left.

All vehicles have a measurable amount of "play" or lost motion in the steering wheel. The age of the vehicle determines the amount of play, but nevertheless it is always there. The apparatus of FIGURE 18 is responsive thereto the rotational motion of steering shaft 302. It must be remembered that the play, which is an inherent part of the steering mechanism, causes actuation of the control means 243 prior to any appreciable force being applied to turning the front wheels. In other words, by turning the steering wheel 304 an infinitesimal amount to the right, the fore and aft rudder devices are actuated to the right an amount which is proportional for the rotation of the wheel to thereby impose a proportional force at the fore and aft rudder location of the vehicle. It is therefore possible to "steer" the vehicle down a level road by utilizing the steering wheel but never actually turning the vehicle wheels, if extreme caution is exercised in turning the steering wheel only the amount permitted by the "play."

Looking to the details of FIGURE 18 once again, it will now be appreciated by those skilled in the art that the handle 324 can be turned in a clockwise or counterclockwise direction whereupon the spaced apart cams 314, 316 will be moved by the chain drive 318, assuming the steering wheel 304 is prevented from moving. It is therefore possible to rigidly hold the steering wheel 304 while using the reset 322 for steering the vehicle with the rudders, or by the application of transverse force only. The purpose of the reset is to enable the driver to either simulate or constantly correct for a predetermined wind velocity. Those skilled in the art will now realize that reset 322 may be accomplished pneumatically, rather than mechanically, if desired, and such a modification would still fall within the comprehension of the present invention.

Upon turning the steering wheel 304 to the right, for example, shaft 302, which is attached to the spaced apart cams in high friction relationship therewith move cam 316 to thereby upset capper valve 344 because of the change in the position of the beforementioned finger. This action moves the flapper closer to the nozzle of the flapper actuated pilot valve located within housing 308, which in turn imposes an increased pressure at connection 356, thereby causing the pressure within conduit 244 to change in proportion to the position of the cam 316 with respect to the finger 312. The relative position of the cam depends upon the shaft 302, and is also proportional to the relative position of the steering wheel 304. Rudders 214, 218 are rotatably moved a limited distance in response to the pressure within conduits 244, 246. Therefore movement of the steering wheel, or of the reset device, moves the rudder either to the right or to the left dependent upon the relative rotational motion of the cams associated with the steering wheel.

While the rudders 214, 218 are preferably placed under the vehicle in the illustrated manner of FIGURES 12–14, and actuated as a combination rudder and brake, it is also contemplated to restrict the operation of the rudder to overcome sidethrust, while utilizing a drag device such as seen in FIGURES 1–10. This is especially so where advantage is to be taken of changing laminar to turbulent flow. It is further contemplated to utilize one set of rudders 214 for steering, while restricting the use of the rearward set of rudders 218 to the function of a drag device.

While the drag device can be of any of the foregoing types which is compatible with the system of FIGURES 12 and 13, it is preferred to utilize a rudder such as 214, 218 as a combination rudder and drag device in accordance with the before discussion. Rather than utilizing manifold pressure and vehicle velocity as a measure of power exerted by the engine in forcing the vehicle to travel down the road, it is preferred to utilize fuel flow in a manner illustrated in 259. Fuel flow meter 259 maintains pneumatic pressure at 261 proportional to the flow of fuel to the engine carburetor. Upon a slight increase in fuel flow, the pressure at 262, 263 is reduced, thereby allowing the rudder devices to become more streamlined, and accordingly satisfying the demand for additional power by reducing the parasitic drag. Conversely, upon a reduction in the fuel flow rate through the metering device 259, pneumatic pressure at 262, 263 is increased to thereby cause each of the adjacent pairs of rudders to be rotated toward each other in the manner of FIGURE 15. This action increases the drag upon the vehicle, and accordingly, maintains the fuel flow essentially constant.

By utilizing each of the above force producing apparatus in conjunction with the pneumatic circuitry of FIGURE 13, it will now be appreciated by those skilled in the art that a predetermined longitudinal, vertical, and transverse force may be maintained upon a vehicle. Each time one of the airfoils is actuated, additional force or drag is either induced or decreased, and accordingly, upon actuation of any one device, the main drag device, that is, the inward turning ability of the rudders, must also be actuated to either a higher or lower drag configuration. This action maintains a constant drag upon the vehicle.

It should be understood that it is usually possible to duplicate electrically what has been accomplished pneumatically so far as pneumatic or electrical circuitry is concerned. Accordingly, it is considered within the comprehension of this invention to actuate the various force producing means by other expedients which those skilled in the art will readily be able to apply to the present invention having now read my disclosure.

While the specific position of the airfoils and drag devices of the present invention have been placed in certain specific locations with respect to the vehicle, it is contemplated to also locate them in other areas, as well as to multiply their number and size. The present invention provides a method and apparatus for maintaining a constant power input into the pneumatic tires associated with the vehicle to thereby simulate a constant grade condition, simulate velocities of the vehicle in excess of the actual velocity being travelled, as well as overcoming variations in wind velocity and changing grade conditions.

By recording the cumulative power input into a tire during a controlled wear test, later tests can be conducted which duplicate the controlled wear test since the severity of test conditions can be selected by controlling the power input into the tires. Furthermore, a specific test can be assembled, or designed, wherein the power input can be controlled to simulate any desired condition of grade and speed. This procedure allows predetermined tests to be conducted wherein the results eliminate many heretofore uncontrolled variables.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. A method of controlling forces imposed upon a pneumatic tire which supports a moving vehicle, comprising the following steps:
   (1) sensing change in the force imposed upon the pneumatic tire;
   (2) inducing a force into the vehicle which is substantially equal to the sensed change in force of step (1);
   (3) applying the force of step (2) in an opposite direction to the force of step (1) to thereby provide the stated function of controlling forces imposed upon the pneumatic tire which supports the vehicle.

2. The method of claim 1 wherein the force sensed in step (1) is a change in the torque brought about by a change in the power output of the vehicle prime mover, and the force provided in step (2) includes the step of changing the parasitic drag of the vehicle.

3. The method of claim 1 wherein the force sensed in step (1) is a change in the apparent weight of the vehicle upon the tires, and the force provided in step (2) includes the step of changing the aerodynamic lift of the vehicle.

4. The method of claim 1 wherein the force sensed in step (1) is a change in the transverse force acting on the vehicle, and the force provided in step (2) includes the step of aerodynamically changing the transverse forces acting upon the vehicle.

5. The method of claim 1 wherein the change in force of step (1) includes longitudinal, vertical, and transverse forces; and the force provided in step (2) includes the following steps:
   (A) moving a horizontally disposed externally located airfoil to provide a change in vertical force.
   (B) moving a vertically disposed externally located rudder to provide a change in transverse force,
   (C) moving an externally located longitudinal force producing means to provide a change in parasitic drag.

6. A method of controlling the power output of a vehicle power plant in order to maintain the application of torque to the driven tires constant, comprising the steps of:
   (1) sensing the torque application as a function of the power output of the power plant;
   (2) inducing a predetermined amount of drag into the vehicle;
   (3) controllably changing the induced drag to thereby compensate for varying conditions encountered by the vehicle to thereby maintain the sensed torque of step (1) essentially constant.

7. The method of claim 6 wherein the induced drag of step (2) is adjusted to a predetermined value which simulates the additional torque normally required to enable the vehicle to ascend a road grade of predetermined slope;
   and, carrying out step (3) to thereby enable simulation of a vehicle climbing a constant slope of any desired length.

8. The method of claim 6, and further including the step of:
   (4) carrying out step (2) by applying the induced drag to the normally free rolling wheels of the vehicle, to thereby cause a torque to be applied to all of the wheels of the vehicle.

9. The method of claim 6, and further including the following steps:
   (4) maintaining a substantially constant power plant r.p.m.;
   (5) inducing the drag of step (2) by a wind resistance device which is extended into the slip stream of the vehicle;
   (6) utilizing step (1) to maintain a controlled signal having a value proportional to the power output of the vehicle;
   (7) carrying out step (3) by positioning the drag device in response to the signal of step (6).

10. The method of claim 6, wherein the drag, torque, and the miles travelled by the tires are recorded to enable subsequent duplication of the same conditions.

11. The method of claim 6 wherein the power plant is an internal combustion engine and the rate of fuel flow thereto is utilized to sense the torque in step (1).

12. The method of claim 6 wherein the power plant is an internal combustion engine and the manifold pressure and r.p.m. are utilized to sense the torque in step (1).

13. A method of controlling the forces to which a moving vehicle is subjected comprising the following steps:
   (1) measuring the vertical dynamic force which is imposed upon the vehicle;
   (2) providing a lifting airfoil which controllably changes the apparent weight of the vehicle upon the tires by adjusting the airfoil to provide a vertical upward or downward resultant force;
   (3) controlling the vertical dynamic force by adjusting the relative position of the airfoil of step (2) with respect to the vehicle.

14. The method of claim 13 wherein two said airfoils are utilized by locating each airfoil at a fore and aft position of the vehicle with respect to the center of gravity;
   (4) carrying out step (1) to determine the dynamic weight imposed upon the front and rear tires;
   (5) carrying out step (2) to adjust the dynamic weight imposed on each tire of the vehicle.

15. Apparatus for controlling the stability of a vehicle comprising:
   vehicle power plant power output sensing means; drag inducing means, means for controlling the drag inducing means, means for maintaining a predetermined vehicle velocity;
   said drag inducing means being controllable in intensity to thereby vary the amount of drag induced into the vehicle;
   said output sensing means being connected to said means for controlling the drag inducing means to thereby position the latter in proportion to the former; whereby, said vehicle travels at a predetermined velocity while the torque exerted upon the driving tires remains constant.

16. The apparatus of claim 15, wherein the drag inducing means includes a parasitic drag device having actuating means by which it may be extended into the slip stream for increasing the drag.

17. The apparatus of claim 16, wherein said sensing means includes a regulator connected to a flow line and positioned with respect to the power plant whereby an increase in r.p.m. or manifold pressure decreases the pressure in the line and a decrease in r.p.m. or manifold pressure increases the pressure in the flow line;

said actuating means includes a cylinder having a piston reciprocatingly received therein and connected to the parasitic drag device;

and a pressure source flow connected to said line, with said line being flow connected to one side of the cylinder; a capillary tube connected to the line; and said cylinder having an opposite end connected to the atmosphere.

18. The apparatus of claim 15, wherein said drag inducing means includes a torque producing means attached to the free rolling wheels;

said torque producing means being in the form of a hydraulic pump having by-pass means by which the torque may be regulated.

19. The apparatus of claim 15, wherein said drag inducing means includes a torque producing means attached to the free rolling wheels;

said torque producing means being in the form of a generator having an electrical resistance associated therewith for regulating the load thereof.

20. The apparatus of claim 15, wherein said drag inducing means includes:

a drive axle, a differential; a drive shaft, including means by which all are connected together and to the normally free rolling wheels;

torque producing means connected to said drive shaft, and control means connected to said torque producing means to control the torque thereof.

21. The apparatus of claim 15, wherein said drag inducing means includes:

a drive axle, a differential; a drive shaft, including means by which all are connected together and to the normally free rolling wheels;

a generator connected to said drive shaft, and electrical generating control means connected to said generator to control the torque provided by said generator.

22. The apparatus of claim 15, wherein said drag inducing means includes:

a drive axle, a differential; a drive shaft, and means by which all are connected together and to the normally free rolling wheels;

a hydraulic pump connected to said drive shaft, and bypass means for regulating the torque provided by the pump.

23. The apparatus of claim 15, wherein the drag inducing means includes a parasitic drag device having actuating means by which it may be extended into the slip stream for increasing the drag and retracted into close proximity of the vehicle for decreasing the drag;

said sensing means includes a regulator connected to a flow line and positioned with respect to the power plant whereby an increase in r.p.m. or manifold pressure decreases the pressure in the line and a decrease in r.p.m. or manifold pressure increases the pressure in the flow line;

said actuating means includes a cylinder having a piston reciprocatingly received therein and connected to the parasitic drag device;

and a pressure source connected to the said line, with said line being connected to the cylinder; a capillary tube connected to the line and communicating with the atmosphere;

and said cylinder having one end connected to the atmosphere.

24. In a vehicle having a body, a prime mover, front and rear tires supporting the vehicle, and a steering shaft adapted to steer the vehicle, the improvement comprising:

apparatus for controlling the stability of the moving vehicle; said apparatus including means for inducing a transverse force, means for inducing a vertical force, and means for changing the longitudinal force;

said means for inducing a transverse force including a rudder journaled to the vehicle and adapted to be rotated in a substantially horizontal plane;

means for moving said rudder to thereby impose a transverse force upon the vehicle.

25. The improvement of claim 24, wherein said means for moving said rudder includes means responsive to the position of the steering wheel whereupon clockwise rotation of the steering wheel turns said rudder to impose a transverse force to the right, while counterclockwise rotation of the steering wheel turns said rudder to impose a transverse force to the left.

26. The improvement of claim 25 wherein one said rudder is located near the front wheels and another said rudder is located near the rear wheels to thereby overcome transverse forces which may be applied to the vehicle.

27. The improvement of claim 24, wherein there appear two pairs of spaced apart rudders, one pair being located near the front wheels and the other pair being located near the rear wheels;

means responsive to the steering wheel for positioning the rudders whereby a transverse force is imparted to the vehicle when the steering wheel is turned;

prime mover power responsive means connected to one pair of rudders and adapted to rotate each rudder in opposite directions with respect to each other to thereby vary the parasitic drag and maintain the power output constant.

28. The improvement of claim 24, wherein said rudder includes spaced apart pairs of rudders, with a first pair being located forwardly of the vehicle and a second pair being located rearwardly of the vehicle;

means responsive to the steering wheel for positioning the rudders whereby a transverse force is imparted to the vehicle when the steering wheel is turned;

prime mover power responsive means connected to one pair of rudders and adapted to rotate each rudder in opposite directions with respect to each other to thereby vary the parasitic drag and maintain the power output constant.

29. The improvement of claim 28, wherein said means for inducing a vertical force includes an airfoil means operatively attached to the vehicle for changing the apparent weight thereof;

means for moving the airfoil in response to the dynamic weight of the vehicle whereby;

the weight of the vehicle is maintained constant with respect to the tires.

30. The improvement of claim 28, wherein said means for inducing a vertical force includes an airfoil means operatively attached in spaced apart relationship at the fore and aft position of the vehicle;

said airfoil including an elevator pivotally mounted to a trunion with said trunion being rigidly affixed to the vehicle;

means responsive to the vehicle's weight imposed upon the tires for actuating the elevators to a position which maintains the apparent weight upon the tires constant.

31. In a vehicle having a body, a prime mover, front and read tires supporting the vehicle, and a steering shaft adapted to steer the vehicle, the improvement comprising:

apparatus for controlling the stability of the moving vehicle; said apparatus including means for inducing a transverse force, means for inducing a vertical force, and means for changing the longitudinal force;

said means for inducing a transverse force including a rudder journaled to the vehicle and adapted to be rotated in a substantially horizontal plane;

means for moving said rudder to thereby impose a transverse force upon the vehicle;

said means for moving said rudder including means responsive to the angular position of the steering shaft;

said means for inducing a vertical force includes an airfoil means operatively attached to the vehicle for changing the apparent weight thereof upon the tires;

means for moving the airfoil in response to the dynamic weight of the vehicle;

a second rudder adjacent the first recited rudder and adapted to be rotated simultaneously therewith;

power responsive means connected to each said rudders and adapted to rotate each rudder in opposite directions with respect to each other to thereby vary the parasitic drag and to maintain the power output constant.

32. A method of controlling forces imposed upon a pneumatic tire which supports a moving vehicle, comprising the following steps:
(1) sensing variation in the force imposed upon the pneumatic tire wherein the variation in force is a change in the torque brought about by a change in the power output of the vehicle prime mover;
(2) changing the parasitic drag of the vehicles so as to induce a force into the vehicle which is substantially equal to the change in force in step (1);
(3) applying the force of step (2) in an opposite direction to the force of step (1) to thereby provide the stated function of controlling forces imposed upon the pneumatic tire which supports the vehicle.

33. A method of controlling forces imposed upon a pneumatic tire which supports a moving vehicle, comprising the following steps:
(1) sensing change in the force imposed upon the pneumatic tire wherein the change represents a variation in the apparent weight of the vehicle upon the tire;
(2) inducing a force into the vehicle which is substantially equal to the change in force in step (1) by changing the aerodynamic lift of the vehicle;
(3) applying the force of step (2) in an opposite direction to the force of step (1) to thereby provide the stated function of controlling forces imposed upon the pneumatic tire which supports the vehicle.

34. A method of controlling forces imposed upon a pneumatic tire which supports a moving vehicle, comprising the following steps:
(1) sensing change in the transverse force imposed upon the pneumatic tire;
(2) inducing a force into the vehicle which is substantially equal to the change in transverse force of step (1); and wherein the induced force includes the step of aerodynamically changing the transverse forces acting upon the vehicle;
(3) applying the force of step (2) in an opposite direction with respect to the force of step (1) to thereby provide the stated function of controlling forces imposed upon the pneumatic tire which supports the vehicle.

35. A method of controlling forces imposed upon a pneumatic tire which supports a moving vehicle, comprising the following steps:
(1) sensing change in the longitudinal, vertical, and transverse forces imposed upon the pneumatic tire;
(2) inducing a force into the vehicle which is substantially equal to the change in force in step (1) by:
(A) moving a horizontally disposed airfoil to provide a change in vertical force;
(B) moving a vertically disposed rudder to provide a change in transverse force;
(C) moving an externally located longitudinal force producing means to provide a change in parasitic drag;
(3) applying the force of step (2) in an opposite direction to the force of step (1) to thereby provide the stated function of controlling forces imposed upon the pneumatic tire which supports the vehicle.

References Cited

UNITED STATES PATENTS

| 2,700,297 | 1/1955 | Allen | 73—141 X |
| 3,149,489 | 9/1964 | Schmaeng | 73—144 X |

JERRY W. MYRACLE, Primary Examiner

U.S. Cl. X.R.

73—146